(12) United States Patent  (10) Patent No.: US 7,577,545 B2
Hu  (45) Date of Patent: Aug. 18, 2009

(54) METHOD AND SYSTEM FOR ESTIMATING ROTOR ANGULAR POSITION AND ROTOR ANGULAR VELOCITY AT LOW SPEEDS OR STANDSTILL

(75) Inventor: Jun Hu, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 11/754,396

(22) Filed: May 29, 2007

(65) Prior Publication Data

US 2008/0300820 A1    Dec. 4, 2008

(51) Int. Cl.
*G01P 3/00* (2006.01)

(52) U.S. Cl. .................................. 702/151; 702/147

(58) Field of Classification Search ............. 702/147, 702/151
See application file for complete search history.

(56) References Cited

U.S. PATENT DOCUMENTS

| | | | |
|---|---|---|---|
| 5,051,680 A | 9/1991 | Belanger | |
| 5,461,293 A | 10/1995 | Rozman | |
| 5,585,703 A | 12/1996 | Acquaviva | |
| 5,793,179 A | 8/1998 | Watkins | |
| 6,163,127 A | 12/2000 | Patel | |
| 6,483,270 B1 | 11/2002 | Miyazaki | |
| 6,583,593 B2 | 6/2003 | Iijima | |
| 6,788,024 B2 | 9/2004 | Kaneko | |
| 6,909,257 B2 * | 6/2005 | Inazumi | 318/727 |
| 6,924,617 B2 * | 8/2005 | Schulz et al. | 318/701 |
| 7,026,772 B2 | 4/2006 | Quirion | |
| 7,072,790 B2 * | 7/2006 | Hu et al. | 702/147 |
| 2006/0052972 A1* | 3/2006 | Hu et al. | 702/147 |

* cited by examiner

*Primary Examiner*—Bryan Bui
*Assistant Examiner*—Jonathan Teixeira Moffat
(74) *Attorney, Agent, or Firm*—Carlson, Gaskey & Olds

(57) ABSTRACT

A method and system for estimating an angular position and an angular velocity of a rotor in a dynamoelectric machine measures an AC current and a potential for each of a plurality of windings coupled to a stator of the dynamoelectric machine, transforms the measured currents and potentials to a stationary frame to produce transformed currents and transformed potentials, and processes the transformed currents and transformed potentials to produce a first intermediate signal and a second intermediate signal. The first intermediate signal and the second intermediate signal are cross-coupled by being processed to obtain a first extended rotor flux value and a second extended rotor flux value that are each functions of the first intermediate signal and the second intermediate signal. The first extended rotor flux value and the second extended rotor flux value are applied to a phase lock loop to derive an estimated rotor angular position and an estimated rotor angular velocity for the dynamoelectric machine.

14 Claims, 6 Drawing Sheets

METHOD AND SYSTEM FOR ESTIMATING ROTOR ANGULAR POSITION AND ROTOR ANGULAR VELOCITY AT LOW SPEEDS OR STANDSTILL

BACKGROUND OF THE INVENTION

This invention relates to rotor angular position and velocity sensing systems for mechanical shaft sensorless control of dynamoelectric machines, and more particularly to an improved system for resolving the position and velocity of a rotor for a dynamoelectric machine using an estimate of extended rotor flux.

In some vehicles, including some aircraft, a motor may be utilized both as a motor and as a generator. Because of this dual function, the motor may be called a dynamoelectric machine. A typical motor comprises a stationary stator, and a rotating rotor. In some motors, it is necessary to detect a position of a rotor in order to sustain operation of the motor. Determining a rotor position typically requires a shaft position sensor. It is desirable to eliminate a mechanical shaft sensor to reduce cost and improve reliability.

Some methods of sensorless rotor position detection include the back EMF method, which determines rotor position based on voltage, the signal injection method, which injects high frequencies into a system, and the method discussed in U.S. Pat. No. 7,072,790 which uses flux to determine rotor position. It is desirable to improve the method U.S. Pat. No. 7,072,790 for applications operating at low speeds or at a standstill.

SUMMARY OF THE INVENTION

A method and system for estimating an angular position and an angular velocity of a rotor in a dynamoelectric machine measures an AC current and a potential for each of a plurality of windings coupled to a stator of the dynamoelectric machine, transforms the measured currents and potentials to a stationary frame to produce transformed currents and transformed potentials, and processes the transformed currents and transformed potentials to produce a first intermediate signal and a second intermediate signal. The first intermediate signal and the second intermediate signal are cross-coupled by being processed to obtain a first extended rotor flux value and a second extended rotor flux value that are each functions of the first intermediate signal and the second intermediate signal. The first extended rotor flux value and the second extended rotor flux value are applied to a phase lock loop to derive an estimated rotor angular position and an estimated rotor angular velocity for the dynamoelectric machine.

These and other features of the present invention can be best understood from the following specification and drawings, the following of which is a brief description.

DETAILED DESCRIPTION OF THE PREFERRED EMBODIMENT

Figure 1:
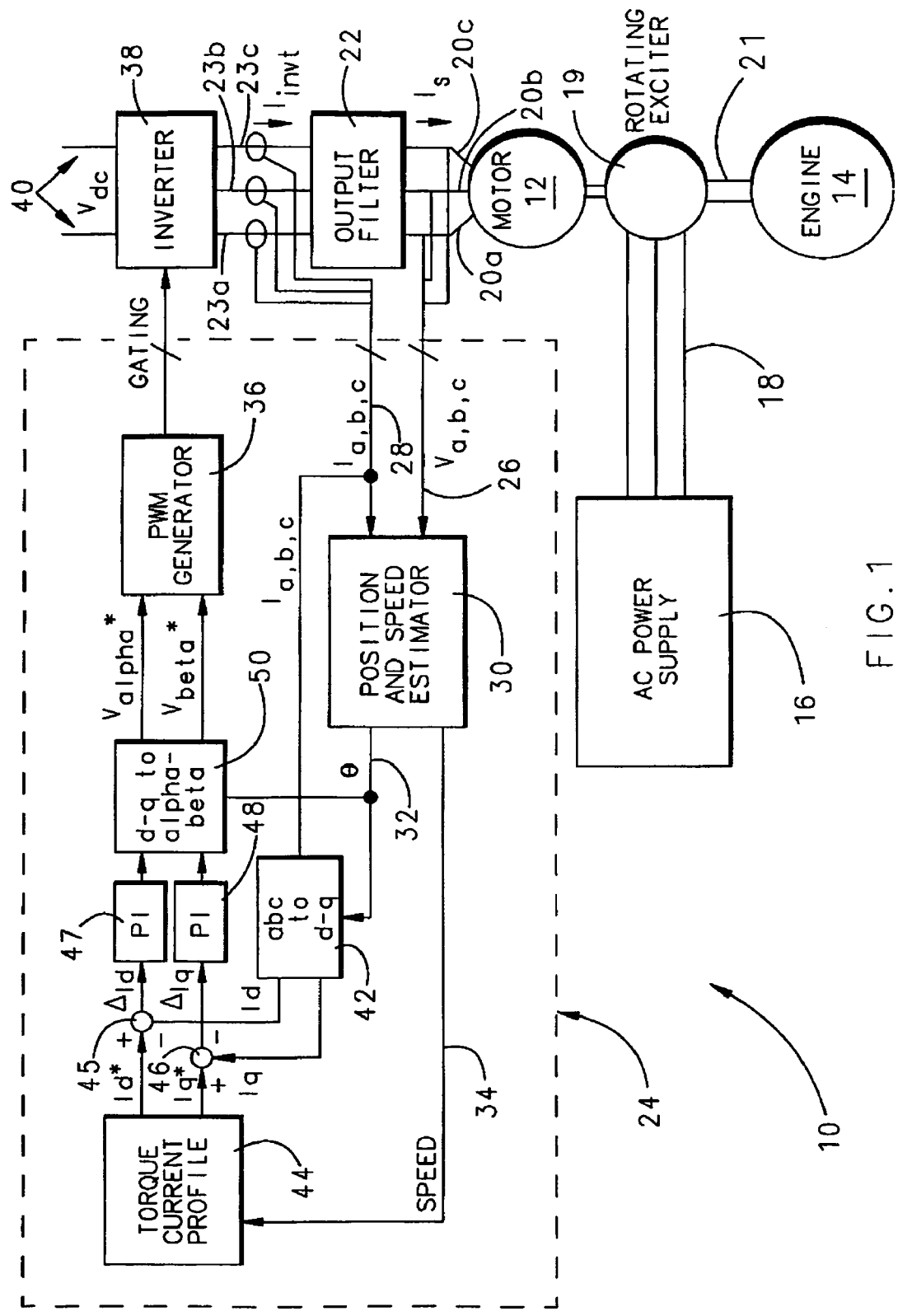
FIG. 1 illustrates a block diagram of a mechanical sensorless rotor angular position and velocity sensing system.

As shown in FIG. 1, the rotor angular position and velocity sensing system 10 comprises a motor 12 that is able to operate as a starter to start an engine 14, or as a generator to power a load (not shown). Because of this dual function, the motor 12 may be called a dynamoelectric machine. In one example, the motor 12 is a brushless motor that requires a controller to know a position of its rotor to operate.

To start the motor 12, an AC power supply 16 provides an AC voltage along supply lines 18 to a rotating exciter 19. In the example of FIG. 1, the AC power supply 16 provides three phases of AC power, however it is understood that other quantities of phases of AC power could be provided. The rotating exciter is connected to a shaft 21 that is also connected to the motor 12 and the engine 14.

The AC voltage from the supply lines 18 induces an AC voltage along motor terminals 20a, 20b, and 20c. The induced voltage causes a current to flow through an output filter 22. A microprocessor 24 measures a voltage 26 and a current 28 from each of the terminals 20a, 20b, and 20c. A position and speed estimator 30 uses the voltage and current measurements to estimate a flux of the motor 12 and to estimate a rotor position 32 and a rotor angular velocity 34.

Once the estimated rotor position 32 and estimated rotor angular velocity 34 have been calculated, an inverter 38 is turned ON. The microprocessor 24 processes the estimated rotor position 32 and estimated rotor angular velocity 34 to control a pulse width modulated (PWM) generator 36. An inverter 38 is coupled to the PWM generator 36 and converts a DC voltage from DC voltage supply lines 40 to AC. This voltage enables AC to flow through the output filter 22, which improves power quality by filtering out harmonics and reducing electromagnetic interference (EMI). The AC from the terminals 20a, 20b, and 20c then flows to a stator of the motor 12 to sustain operation of the motor 12.

FIG. 1 illustrates how the microprocessor 24 processes the estimated rotor position 32 and estimated rotor angular velocity 34 to control the inverter 38. An abc to d-q frame transformer 42 uses the estimated rotor position 32 to transform the current measurements 28 to a rotating d-q frame to obtain current values $I_d$ and $I_q$. A torque current profile generator 44 uses the estimated rotor angular velocity 34 to lookup reference current values $I_d^*$ and $I_q^*$. Comparators 45 and 46 compare the transformed $I_d$ and $I_q$ values to reference current values $I_d^*$ and $I_q^*$ to determine differences $\Delta I_d$ and $\Delta I_q$ between the transformed values and the reference values.

Proportional and integral (PI) regulators 47 and 48 process the differences $\Delta I_d$ and $\Delta I_q$ using proportional and integral gains, and transmit an output signal to d-q to alpha-beta frame transformer 50, which converts the output into a stationary α-β frame to produce $V_{alpha}^*$ and $V_{beta}^*$ signals which are transmitted to the PWM generator 36. The PWM generator then controls the inverter 38 accordingly to produce a desired AC voltage.

The output filter 22 comprises an inductor and a capacitor (not shown) in each phase. An input current $I_{invt}$ flows from the inverter 38 along the windings 23a, 23b, and 23c to the output filter 22, and an output current $I_s$ flows from the output filter 22 along the terminals 20a, 20b, and 20c to the motor 12. The current flowing through the capacitor can be calculated by the following equation:

$$\hat{I}_c = C\frac{dV_s}{dt} \quad \text{equation \#1}$$

where $\hat{I}_c$ is an estimated capacitor current; and
$V_s$ is one of the voltage measurements 26.

A motor current can then be calculated using the following equation:

$$I_s = I_{invt} - \hat{I}_c \quad \text{equation \#2}$$

where $I_s$ is the calculated motor current; and
$I_{invt}$ is the inverter output current.

Equations 1 and 2 apply to all three phases A, B, and C corresponding to the three windings 20a, 20b, and 20c.

The voltage measurements 26 and current measurements 28 are measured from each of the three terminals (20a, 20b, 20c) and each of the three windings (23a, 23b, 23c) in an a-b-c frame. The current measurement 28 is a measurement of the inverter output current $I_{invt}$. A flux estimation is implemented in an alpha-beta ($\alpha$-$\beta$) stationary frame. The relationship between the $\alpha$-$\beta$ frame and the a-b-c frame is described in the following equation:

$$\begin{bmatrix} f_\alpha \\ f_\beta \end{bmatrix} = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}\begin{bmatrix} f_a \\ f_b \\ f_c \end{bmatrix} \quad \text{equation \#3}$$

where f can be replaced with voltage, current, or flux;
a, b, and c represent the phases of current on the terminals 20a, 20b, and 20c in the a-b-c frame; and
$\alpha$ and $\beta$ represent axes of the $\alpha$-$\beta$ frame.

The stationary $\alpha$-$\beta$ frame is a two phase frame and is a necessary step in calculating flux. Equation #3 is used to determine an $\alpha$-axis voltage $V_\alpha$, a $\beta$-axis voltage $V_\beta$, an $\alpha$-axis current $I_\alpha$, and a $\beta$-axis current $I_\beta$.

The following equation can then be used to determine an extended rotor flux in the $\alpha$-$\beta$ stationary frame:

$$\begin{bmatrix} \lambda_{ext\_\alpha} \\ \lambda_{ext\_\beta} \end{bmatrix} = \frac{1}{s}\left(\begin{bmatrix} V_\alpha \\ V_\beta \end{bmatrix} - \begin{bmatrix} R_s & 0 \\ 0 & R_s \end{bmatrix}\begin{bmatrix} I_\alpha \\ I_\beta \end{bmatrix}\right) - \begin{bmatrix} L_q & 0 \\ 0 & L_q \end{bmatrix}\begin{bmatrix} I_\alpha \\ I_\beta \end{bmatrix} \quad \text{equation \#4}$$

where $\lambda_{ext\_\alpha}$ is an alpha extended rotor flux;
$\lambda_{ext\_\beta}$ is a beta extended rotor flux;
$R_s$ is a stator resistance;
Lq is a q-axis inductance; and
1/s is an integrator.

Equation #4 can be used to determine flux in both salience and non-salience motors. As shown in equation #4, an integrator 1/s is required to calculate extended rotor flux. The integrator 1/s is an operator, not a variable.

One problem that may arise when using a pure integrator, such as "1/s", is a DC drift problem, in which a small DC component in an AC signal can cause a substantial error in a flux determination. To avoid the DC drift problem associated with a pure integrator, lag functions, such as $$\frac{1}{s+\omega_i} \text{ and } \frac{\omega_i}{s+\omega_i},$$

may be used, as shown in the following equation:

$$\begin{bmatrix} \lambda_{ext\_\alpha} \\ \lambda_{ext\_\beta} \end{bmatrix} = \begin{bmatrix} 1 & \frac{\omega_i}{s+\omega_i} \\ -\frac{\omega_i}{s+\omega_i} & 1 \end{bmatrix}\frac{1}{s+\omega_i}\left(\begin{bmatrix} V_\alpha \\ V_\beta \end{bmatrix} - \begin{bmatrix} I_\alpha & 0 \\ 0 & I_\beta \end{bmatrix}\right) - \begin{bmatrix} L_q & 0 \\ 0 & L_q \end{bmatrix}\begin{bmatrix} I_\alpha \\ I_\beta \end{bmatrix} \quad \text{equation \#5}$$

where $\omega_i$ is a selected corner frequency.

Figure 2:
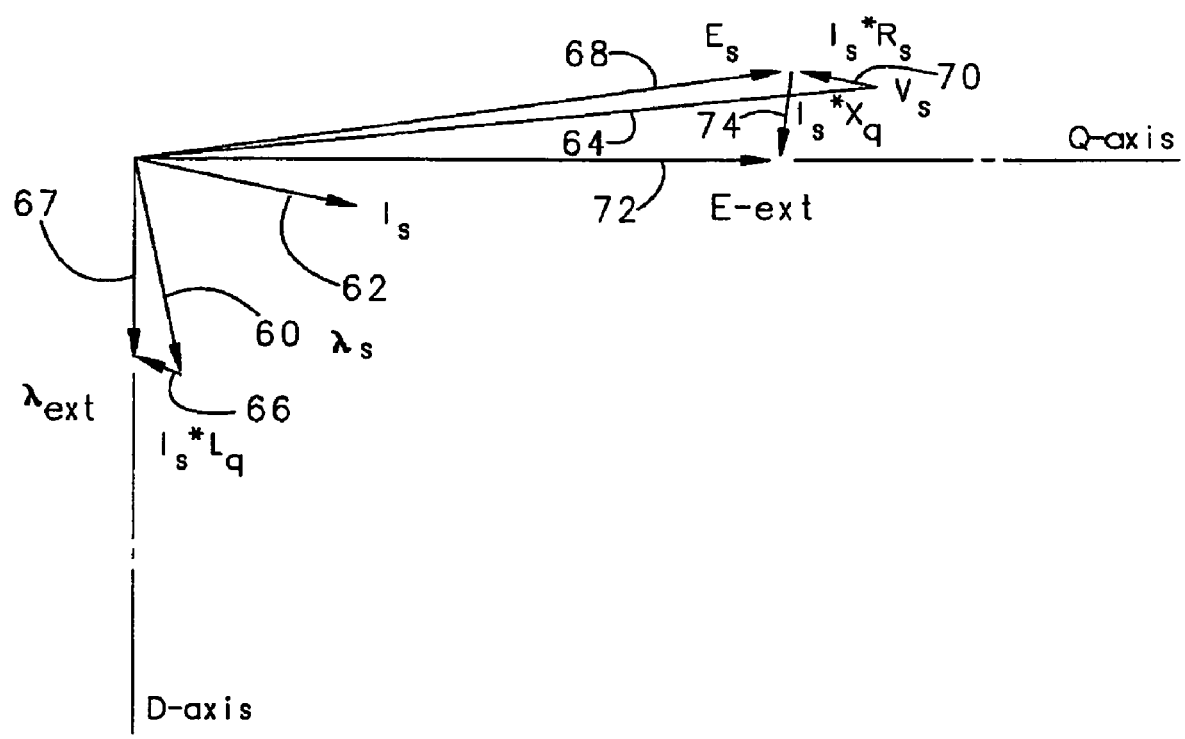
FIG. 2 illustrates a phasor diagram of electrical parameters related to extended rotor flux.

FIG. 2 illustrates a phasor diagram in the rotating d-q frame. FIG. 2 illustrates the relationship between extended rotor flux and back EMF.

A flux $\lambda_s$ in the stator of the motor 12 is represented by a phasor 60. A stator current $I_s$ is represented by a phasor 62. A stator potential $V_s$ is represented by a phasor 64. A phasor 66 represents $I_s*L_q$ where $L_q$ is a q-axis rotor inductance. A vector sum of the phasor 60, representing $\lambda_s$, and the phasor 66, representing $I_s*L_q$, is an extended rotor flux $\lambda_{ext}$, which aligns with the d-axis of the d-q frame, and is represented by a phasor 67.

A back electromotive force (EMF) $E_s$ is represented by a phasor 68. As shown in FIG. 2, the back EMF $E_s$ is perpendicular to the stator flux $\lambda_s$. The back EMF $E_s$, represented by the phasor 68, is a vector sum of the stator potential $V_s$ represented by phasor 64 and stator resistance potential drop $I_s*R_s$ represented by a phasor 70, where $R_s$ is the stator resistance.

An extended back electromotive force (EEMF), $E_{ext}$, in the stator is represented by a phasor 72, and aligns with the q-axis of the d-q frame. $I_s*X_q$, where $X_q$ is a q-axis stator reactance, is represented by a phasor 74. The extended back EMF represented by phasor 72 is a vector sum of $E_s$ represented by phasor 68 and $I_s*X_q$ represented by a phasor 74.

Figure 3:
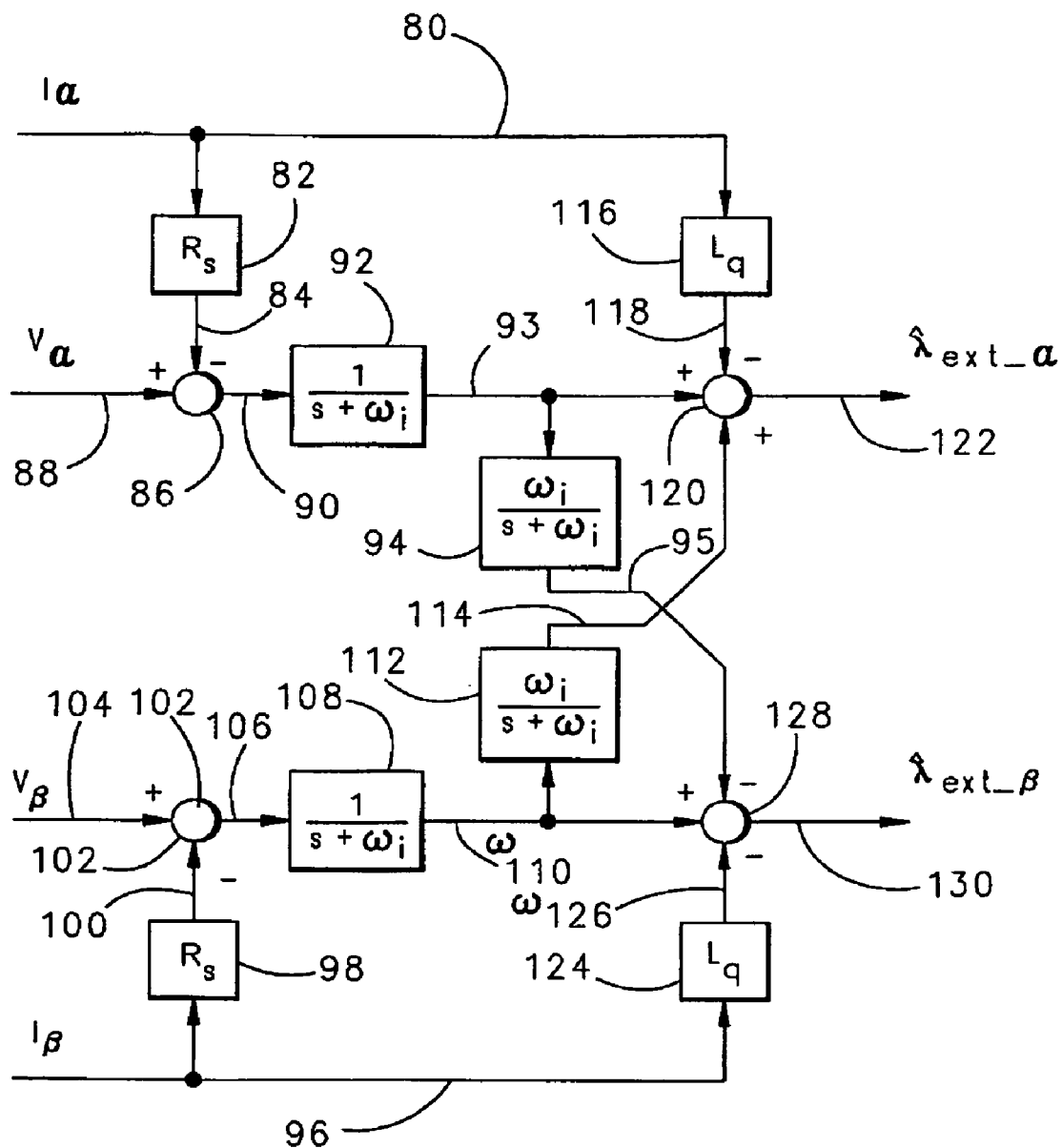
FIG. 3 illustrates a block diagram of operations performed within the system of FIG. 1 to calculate a first extended rotor flux value and a second extended rotor flux value.

FIG. 3 illustrates a block diagram of the flux estimation algorithm shown in equation #5. As shown in FIG. 3, a transformed measured current $I_\alpha$ for the $\alpha$-axis on a signal path 80 is multiplied by the stator resistance $R_s$ 82 to produce $I_\alpha*R_s$ on a signal path 84. A summer 86 subtracts $I_\alpha*R_s$ on the signal path 84 from the transformed potential $V_\alpha$ on a signal path 88 to produce $V_\alpha-(I_\alpha*R_s)$ on a signal path 90. $V_\alpha-(I_\alpha*R_s)$ on the signal path 90 is multiplied by a $$\frac{1}{s+\omega_i}$$

first lag function 92 to produce $$\frac{1}{s+\omega_i}(V_\alpha - (I_\alpha * R_s))$$

on a signal path 93.

$$\frac{1}{s+\omega_i}(V_\alpha - (I_\alpha * R_s))$$

on the signal path 93 is multiplied by a $$\frac{\omega_i}{s+\omega_i}$$

second lag function 94 to produce $$\frac{\omega_i}{s+\omega_i}(V_\alpha - (I_\alpha * R_s))$$

on a signal path 95.

Additionally, a transformed measured current $I_\beta$ for the β-axis on a signal path 96 is multiplied by the stator resistance $R_s$ 98 to produce $I_\beta * R_s$ on a signal path 100. A summer 102 subtracts $I_\beta * R_s$ on the signal path 100 from the transformed potential $V_\beta$ on a signal path 104 to produce $V_\beta - (I_\beta * R_s)$ on a signal path 106. $V_\beta - (I_\beta * R_s)$ on the signal path 106 is multiplied by the $$\frac{1}{s+\omega_i}$$

first lag function 108 to produce $$\frac{1}{s+\omega_i}(V_\beta - (I_\beta * R_s))$$

on a signal path 110.

$$\frac{1}{s+\omega_i}(V_\beta - (I_\beta * R_s))$$

on the signal path 110 is multiplied by the $$\frac{\omega_i}{s+\omega_i}$$

second lag function 112 to produce $$\frac{\omega_i}{(s+\omega_i)^2}(V_\beta - (I_\beta * R_s))$$

on a signal path 114.

The transformed measured current $I_\alpha$ for the α-axis on the signal path 80 is also multiplied by a q-axis inductance $L_q$ 116 to produce $I_\alpha * L_q$ on the signal path 118. A summer 120 subtracts $I_\alpha * L_q$ on the signal path 118 from $$\frac{\omega_i}{(s+\omega_i)^2}(V_\alpha - (I_\alpha * R_s))$$

on the signal path 93 and adds $$\frac{\omega_i}{(s+\omega_i)^2}(V_\beta - (I_\beta * R_s))$$

from the signal path 114 to produce $$\frac{1}{s+\omega_i}(V_\alpha - (I_\alpha * R_s)) \frac{\omega_i}{(s+\omega_i)^2}(V_\beta - (I_\beta * R_s)) - I_\alpha * L_q$$

which corresponds to the extended rotor flux on the α-axis $\hat{\lambda}_{ext\_\alpha}$ on the signal path 122. The "^" notation indicates that the extended rotor flux is an estimate based on measured values.

Additionally, the transformed measured current $I_\beta$ for the β-axis on the signal path 96 is also multiplied by a q-axis inductance $L_q$ 124 to produce $I_\beta * L_q$ on the signal path 126. A summer 128 subtracts $I_\beta * L_q$ on the signal path 126 from $$\frac{1}{s+\omega_i}(V_\beta - (I_\beta * R_s))$$

on the signal path 110 and subtracts $$\frac{\omega_i}{(s+\omega_i)^2}(V_\alpha - (I_\alpha * R_s))$$

on the signal path 95 from $$\frac{1}{s+\omega_i}(V_\beta - (I_\beta * R_s))$$

on the signal path 110 to produce $$\frac{1}{s+\omega_i}(V_\beta - (I_\beta * R_s)) - \frac{\omega_i}{(s+\omega_i)^2}(V_\alpha - (I_\alpha * R_s)) - I_\beta * L_q$$

which corresponds to the extended rotor flux on the β-axis $\hat{\lambda}_{ext\_\beta}$ on the signal path 130. Once again, the "^" notation indicates that the extended rotor flux is an estimate based on measured values.

As shown in FIG. 3, the signal paths 95 and 114 cross-couple the signal paths 93 and 110.

The following equation can be used to describe the relationship between the extended rotor flux and the rotor position:

$$\begin{bmatrix} \lambda_{ext\_\alpha} \\ \lambda_{ext\_\beta} \end{bmatrix} = |\lambda| \begin{bmatrix} \cos(\theta) \\ \sin(\theta) \end{bmatrix}; \quad \text{equation \#6}$$

where θ is the rotor position; and
λ is a flux amplitude.

Using equation #6, it would be possible to use an arctangent function to calculate a rotor position. Another option is to used a phase-locked loop (PLL) to derive position and angular velocity information.

Figure 4:
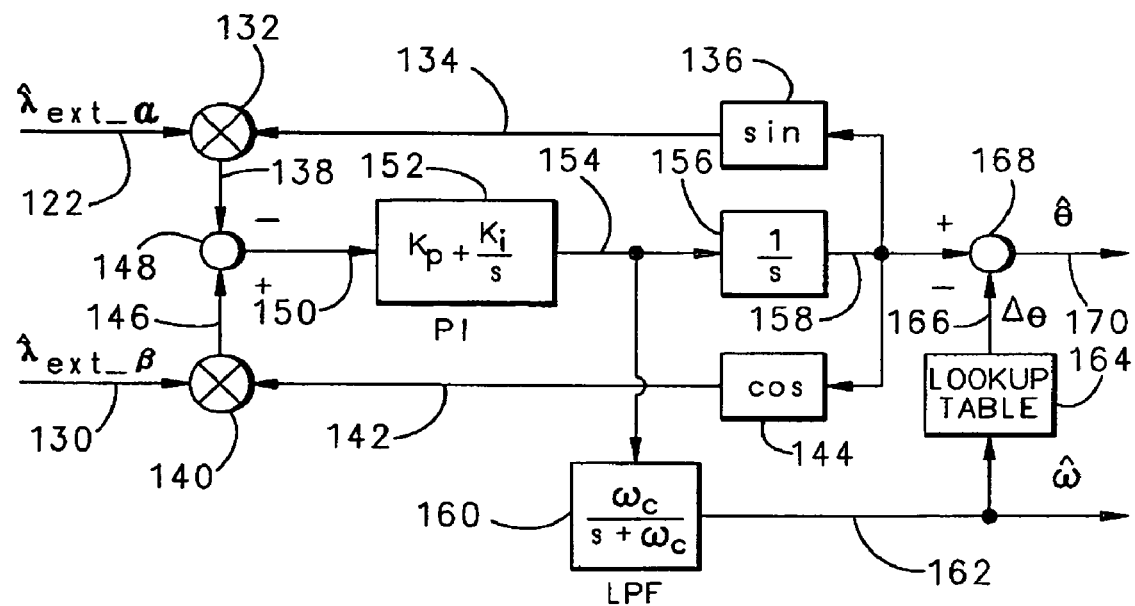
FIG. 4 illustrates a block diagram of how a microprocessor of FIG. 1 uses a phase lock loop (PLL) to obtain an estimated rotor angular position and an estimated rotor angular velocity.

FIG. 4 is a block diagram illustrating how the microprocessor 24 uses a phase lock loop (PLL) to improve an estimate of rotor angular position and rotor angular velocity. The estimated α-axis extended rotor flux $\hat{\lambda}_{ext\_\alpha}$ and the estimated β-axis extended rotor flux $\hat{\lambda}_{ext\_\beta}$ are applied to the signal paths 122 and 130. A multiplier 132 multiplies the estimated α-axis extended rotor flux $\hat{\lambda}_{ext\_\alpha}$ with a feedback signal on a signal path 134 from a sine function 136 to produce an α-axis multiplier output signal on a signal path 138. Likewise, a multiplier 140 multiplies the estimated β-axis extended rotor flux $\hat{\lambda}_{ext\_\beta}$ with a feedback signal on a signal path 142 from a cosine function 144 to produce a β-axis multiplier output signal on a signal path 146.

A summer 148 subtracts the α-axis multiplier output signal on the signal path 138 from the β-axis multiplier output signal on the signal path 146 to produce a difference signal on a signal path 150. A proportional and integral (PI) regulator function 152 multiplies the difference signal on the signal path 150 by the function $$K_p + \frac{K_i}{s}$$

to produce a PI output signal on a signal path 154. $K_i$ is an integral gain of the PI function 152, and $K_p$ is a proportional gain of the PI function 152. Both $K_i$ and $K_p$ are constants based on a design of the system 10 as shown in FIG. 1.

An integral function 156 multiplies the PI output signal on the signal path 154 by the function 1/s to produce an integration output signal on a signal path 158. The integration output signal on the signal path 158 is also fed into the inputs of the sine function 136 and the cosine function 144 to provide the PLL.

A low pass filter (LPF) function 160 multiplies the PI output signal on the signal path 154 by a third lag function $$\frac{\omega_c}{s + \omega_c}$$

to produce an estimated rotor angular velocity $\hat{\omega}$ on a signal line 162, where $\omega_c$ is a corner or cutoff frequency of the LPF function 160. A low pass filter associated with the LPF function 160 is used to smooth out the signal on the signal line 154.

The integration output signal on the signal path 158 is compensated by an offset $\Delta\theta$ to obtain a final estimated rotor angular position $\hat{\theta}$. The offset $\Delta\theta$ can be a lump-sum error of miscellaneous delays, including delays introduced by the lag functions 92, 108 of the FIG. 3, digital sampling delays introduced in measured voltage and current signals, and computation delays in the microprocessor 24 as shown in FIG. 1. A lookup table 164 may be used to compensate for this phase delay $\Delta\theta$. The lookup table 164 generates a suitable phase delay $\Delta\theta$ on a signal path 166, and a summer 168 subtracts the phase delay $\Delta\theta$ from the integration output signal on the signal path 158 to produce the estimated rotor angular position $\hat{\theta}$ on a signal path 170.

Figure 5:
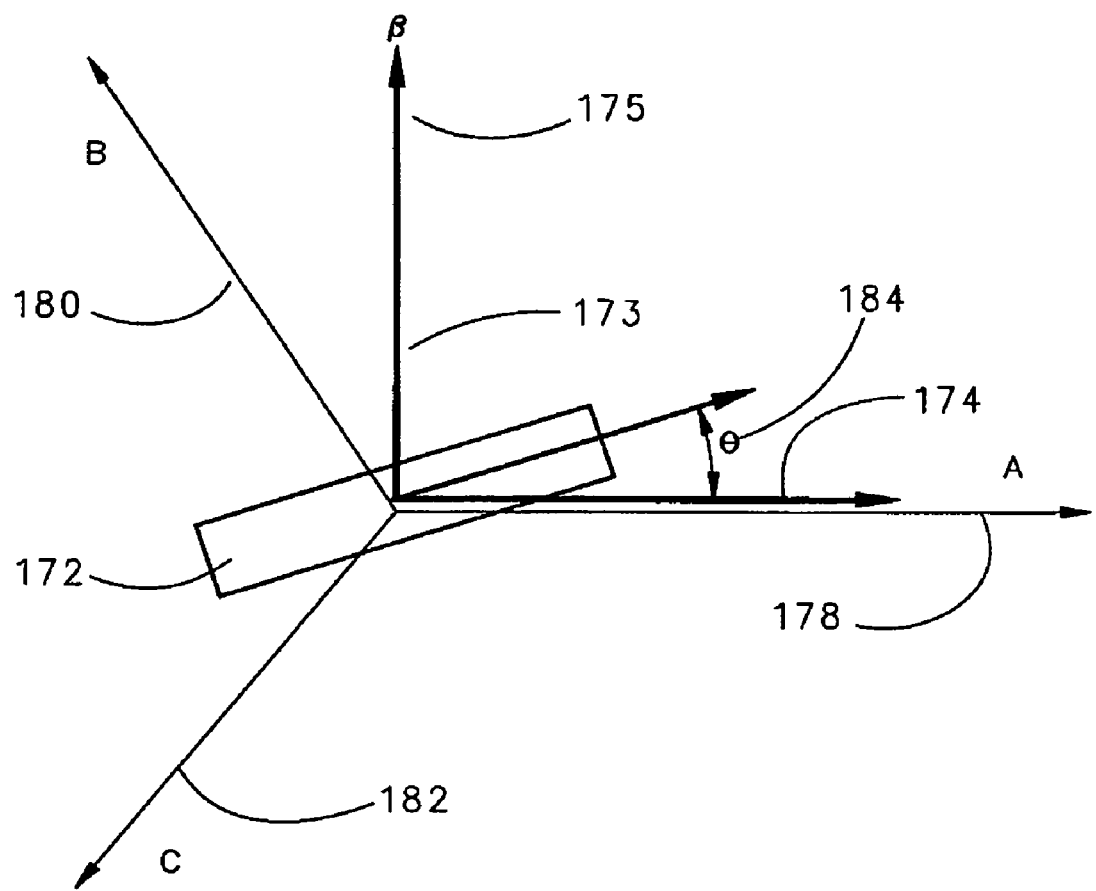
FIG. 5 illustrates how a stationary frame of the system of FIG. 1 aligns with multiple phases of AC.

FIG. 5 illustrates how the α-β frame 173 comprises an α-axis 174 and a β-axis 175 that are perpendicular to each other. The α-β frame 173 aligns with a first phase 178, a second phase 180 and a third phase 182 of the system 10. A rotor 172 rotates, and its displacement from the α-axis is shown by the angle θ 184, which is the rotor angular position to be estimated.

When the motor 12 is at a standstill, as magnetic flux in the motor 12 changes in magnitude, a voltage is induced on the motor terminals 20a, 20b, and 20c, which can be sensed by the microprocessor 24. The induced stator voltages in the α-β frame can be described by the following equation:

$$V_\alpha = \frac{d\lambda_s}{dt}\cos(\theta_0)$$

$$V_\beta = \frac{d\lambda_s}{dt}\sin(\theta_0)$$

where $\lambda_s$ is a magnitude of stator flux; and
$\theta_0$ is an initial rotor position angle at standstill.

The measured voltage 26 can be transformed to an alpha-beta frame. The transformed measured voltages $V_\alpha$ and $V_\beta$ may be fed into the PLL as shown in FIG. 4 to obtain the initial position angle $\theta_0$. In that case, the voltage $V_\alpha$ replaces the flux $\hat{\lambda}_{ext\_\alpha}$ on the signal path 122, and the voltage $V_\beta$ replaces the flux $\hat{\lambda}_{ext\_\beta}$ on the signal path 130 in FIG. 4.

Figure 6:
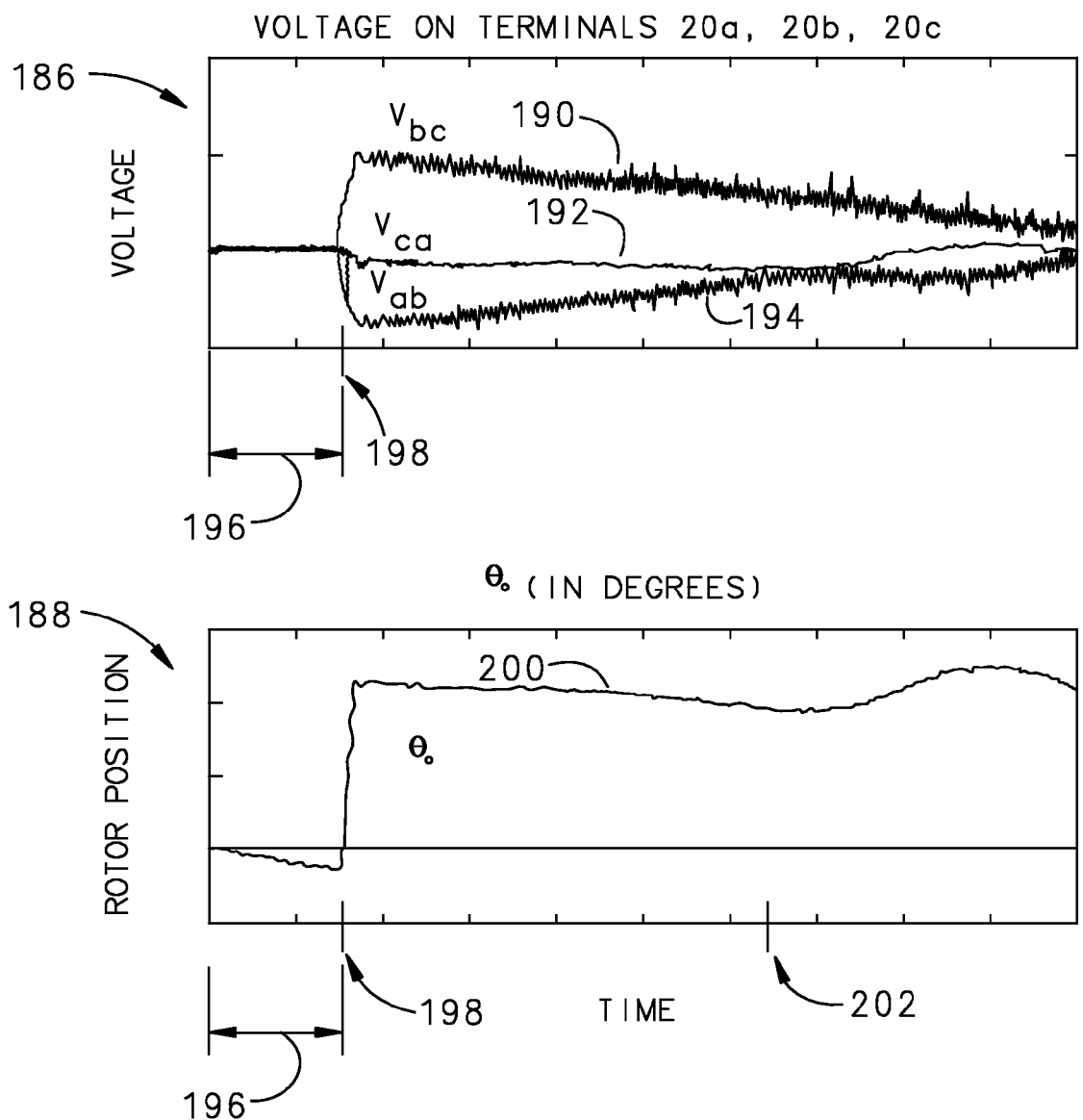
FIG. 6 illustrates an initial stator voltage and an initial rotor position as a function of time.

FIG. 6 illustrates an initial stator voltage and an initial rotor position as a function of time. During startup the rotating exciter 19 is powered on by the ac power supply 16 in FIG. 1. Graph 186 illustrates a line-to-line voltage for each phase of the motor 12 as a function of time, and graph 188 illustrates an estimated rotor position as a function of time in the motor 12. The inverter 38 is OFF in the time periods shown in graphs 186 and 188. A voltage 190 corresponds to a $V_{BC}$ line-to-line voltage, a voltage 192 corresponds to a $V_{CA}$ line-to-line voltage, and a voltage 194 corresponds to a $V_{AB}$ line-to-line voltage. An estimated rotor position θ 200 corresponds to an angle of the rotor 172.

During an initial time period 196, the AC power supply 16 is OFF, and the three voltages 190, 192, and 194 voltage close to zero and the estimated rotor position $\theta_0$ 200 cannot be used to determine actual rotor position. At time 198, the AC power supply 16 turns ON and current flows to the rotating exciter 19 through the supply line 18 in the system 10. During this period, an excitation magnetic field of the motor 12 is arising. The rising magnetic flux induces voltage at the terminals 20a, 20b, and 20c of the system 10. The magnitude of voltages 190, 192 and 194 is sufficient for the microprocessor 24 to be able to estimate rotor position $\theta_0$ 200. In graph 188, from time 198 to approximately time 202 the value of $\theta_0$ remains stable, and after time 202 the value starts to fluctuate due to a decaying voltage signal as shown in graph 186. This stable period demonstrates that a rotor position can be estimated from the voltages 190, 192, and 194 during the stable time period.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of estimating rotor angular position and rotor angular velocity for a dynamoelectric machine comprising the steps of:
   measuring an AC current and a potential for each of a plurality of windings coupled to a stator of the dynamoelectric machine;

transforming the plurality AC currents and potentials to a two-phase α-β stationary frame having an α-axis and a β-axis to produce a first transformed current $I_\alpha$, a second transformed current $I_\beta$, a first transformed potential $V_\alpha$, and a second transformed potential $V_\beta$;

processing the first transformed current and the first transformed potential, and processing the second transformed current and the second transformed potential to obtain a first intermediate signal and a second intermediate signal, comprising:

multiplying the first transformed current $I_\alpha$, a and the second transformed current $I_\beta$ by a resistance $R_s$ of the stator to produce signals $I_\alpha*R_s, I_\beta*R_s$;

subtracting the signals $I_\alpha*R_s, I_\beta*R_s$ from the first transformed potential $V_\alpha$ and the second transformed potential $V_\beta$ to produce signals $V_\alpha-I_\alpha*R_s, V_\beta-I_\beta*R_s$; and multiplying the signals $V_\alpha-I_\alpha*R_s, V_\beta-I_\beta*R_s$ by a first lag function $$\frac{1}{s+\omega_i},$$

wherein $\omega_i$ is a selected corner frequency for the lag function and s is a Laplace operator, to produce first intermediate signal $$\frac{1}{s+\omega_i}(V_\alpha - I_\alpha * R_s)$$

and second intermediate signal $$\frac{1}{s+\omega_i}(V_\beta - I_\beta * R_s);$$

cross-coupling the first intermediate signal and the second intermediate signal to produce a third intermediate signal and a fourth intermediate signal, comprising:

multiplying the first intermediate signal $$\frac{1}{s+\omega_i}(V_\alpha - I_\alpha * R_s)$$

and the second intermediate signal $$\frac{1}{s+\omega_i}(V_\beta - I_\beta * R_s);$$

by a second lag function $$\frac{\omega_i}{s+\omega_i}$$

to produce signals $$\frac{\omega_i}{(s+\omega_i)^2}(V_\alpha - I_\alpha * R_s), \frac{\omega_i}{(s+\omega_i)^2}(V_\beta - I_\beta * R_s);$$

adding the signal $$\frac{\omega_i}{(s+\omega_i)^2}(V_\beta - I_\beta * R_s)$$

to the first intermediate signal $$\frac{1}{s+\omega_i}(V_\alpha - I_\alpha * R_s)$$

to produce the third intermediate signal $$\frac{1}{s+\omega_i}(V_\alpha - I_\alpha * R_s) + \frac{\omega_i}{(s+\omega_i)^2}(V_\beta - I_\beta * R_s); \text{ and}$$

subtracting the signal $$\frac{\omega_i}{(s+\omega_i)^2}(V_\alpha - I_\alpha * R_s)$$

from the second intermediate signal $$\frac{1}{s+\omega_i}(V_\beta - I_\beta * R_s)$$

to produce the fourth intermediate signal $$\frac{1}{s+\omega_i}(V_\beta - I_\beta * R_s) - \frac{\omega_i}{(s+\omega_i)^2}(V_\alpha - I_\alpha * R_s).$$

processing the third intermediate signal and fourth intermediate signal to obtain a first extended rotor flux value corresponding to the α-axis and a second extended rotor flux value corresponding to the β-axis; and applying the first extended rotor flux value and the second extended rotor flux value to a phase lock loop to derive an estimated rotor angular position and an estimated rotor angular velocity for the dynamoelectric machine.

2. The method of claim 1, wherein the step of processing the third intermediate signal and fourth intermediate signal to obtain a first extended rotor flux value and a second rotor flux value comprises the steps of:

multiplying the transformed currents $I_\alpha, I_\beta$ by a q-axis inductance $L_q$ of the stator to produce signals $I_\alpha*L_q$, $I_\beta*L_q$;

subtracting the signal $I_\alpha * L_q$ from the third intermediate signal $$\frac{1}{s+\omega_i}(V_\alpha - I_\alpha * R_s) + \frac{\omega_i}{(s+\omega_i)^2}(V_\beta - I_\beta * R_s)$$

to produce a signal $$\frac{1}{s+\omega_i}(V_\alpha - I_\alpha * R_s) + \frac{\omega_i}{(s+\omega_i)^2}(V_\beta - I_\beta * R_s) - I_\alpha * L_q$$

that corresponds to the first extended rotor flux value; and subtracting the signal $I_\beta * L_q$ from the fourth intermediate signal $$\frac{1}{s+\omega_i}(V_\beta - I_\beta * R_s) - \frac{\omega_i}{(s+\omega_i)^2}(V_\alpha - I_\alpha * R_s)$$

to produce a signal $$\frac{1}{s+\omega_i}(V_\beta - I_\beta * R_s) - \frac{\omega_i}{(s+\omega_i)^2}(V_\alpha - I_\alpha * R_s) - I_\beta * L_q$$

that corresponds to the second extended rotor flux value.

3. The method of claim 2, wherein the selected corner frequency $\omega_i$ is fixed.

4. The method of claim 2, wherein the selected corner frequency $\omega_i$ is adjustable.

5. The method of claim 2, wherein the step of applying the first extended rotor flux value and the second extended rotor flux value to a phase lock loop to derive an estimated rotor angular position and an estimated rotor angular velocity for the dynamoelectric machine comprises the steps of:

multiplying the first extended rotor flux value with a sine function feedback signal to produce an α-axis multiplier output signal;

multiplying the second extended rotor flux value with a cosine function feedback signal to produce an β-axis multiplier output signal;

subtracting the α-axis multiplier output signal from the β-axis multiplier output signal to produce a difference signal;

multiplying the difference signal by a proportional and integral regulator function $$K_p + \frac{K_i}{s}$$

to produce a PI output signal, wherein $K_p$ is a constant value corresponding to a proportional gain of the proportional and integral regulator function, $K_i$ is a constant value corresponding to an integral gain of the proportional and integral regulator function, and s is a Laplace operator;

multiplying the PI output signal by an integral function 1/s to produce an integration output signal;

multiplying the integration output signal by a sine function to produce the sine feedback signal; and multiplying the integration output signal by a cosine function to produce the cosine feedback signal, wherein the estimated rotor angular position and the estimated rotor angular velocity for the dynamoelectric machine are derived from the proportional and integral regulator function output signal and the integration output signal.

6. The method of claim 5, further comprising the steps of:

multiplying the proportional and integral regulator function output signal by a low pass filter function $$\frac{\omega_c}{s+\omega_c}$$

to produce the estimated rotor angular velocity $\hat{\omega}$, where $\omega_c$ is a corner frequency of the low pass filter function;

generating a delay compensation based on a value of the estimated rotor angular velocity; and subtracting the delay compensation from the integration output signal to produce the estimated rotor angular position.

7. The method as recited in claim 1, further comprising the step of monitoring the potentials of the plurality of windings coupled to the stator of the dynamoelectric machine, wherein the step of applying the first extended rotor flux value and the second extended rotor flux value to a phase lock loop to derive an estimated rotor angular position and an estimated rotor angular velocity for the dynamoelectric machine is performed in response to the potentials exceeding a certain threshold.

8. A method of estimating rotor angular position and rotor angular velocity for a dynamoelectric machine comprising the steps of:

measuring an AC current and a potential for each of a plurality of windings coupled to a stator of the dynamoelectric machine;

transforming the plurality AC currents and potentials to a stationary frame to produce a first transformed current, a second transformed current, a first transformed potential, and a second transformed potential;

processing the first transformed current and the first transformed potential, and processing the second transformed current and the second transformed potential to obtain a first intermediate signal and a second intermediate signal;

cross-coupling the first intermediate signal and the second intermediate signal to produce a third intermediate signal and a fourth intermediate signal;

processing the third intermediate signal and fourth intermediate signal to obtain a first extended rotor flux value and a second extended rotor flux value;

applying the first extended rotor flux value and the second extended rotor flux value to a phase lock loop to derive an estimated rotor angular position and an estimated rotor angular velocity for the dynamoelectric machine; and indicating a fault condition if the rotor angular position for the dynamoelectric machine cannot be determined within a predetermined period of time.

9. A control for estimating an initial rotor angular position and a rotor angular velocity for a dynamoelectric machine from a standstill comprising:

a reference frame transformation function for transforming an AC potential for each of a plurality of windings coupled to a stator of the dynamoelectric machine to a stationary frame to produce a first transformed potential and a second transformed potential; and a phase lock loop to derive an estimated rotor angular position and an estimated rotor angular velocity for the dynamoelectric machine from the first transformed potential and the second transformed potential, wherein if the rotor angular position for the dynamoelectric machine cannot be determined within a predetermined period of time after a rotating exciter is powered on the system indicates a fault condition.

10. The control of claim 9, wherein if the potential of each of the plurality of windings does not exceed a certain threshold, the control designates the estimated rotor angular position and estimated rotor angular velocity as invalid.

11. The control of claim 9, wherein if the rotor angular position for the dynamoelectric machine can be determined within a predetermined period of time after a rotating exciter is powered on, an inverter is turned on.

12. The control of claim 9, wherein the stationary frame is a two-phase $\alpha$-$\beta$ frame having an $\alpha$-axis and a $\beta$-axis, and the first transformed potential is $V_\alpha$ and the second transformed potential is $V_\beta$.

13. The control of claim 9, wherein the phase lock loop to derive estimated rotor angular position value and estimated rotor velocity value for the dynamoelectric machine from the first transformed potential and the second transformed potential comprises:

a first multiplier for multiplying the first transformed potential with a sine function feedback signal to produce an $\alpha$-axis multiplier output signal;

a second multiplier for multiplying the second transformed potential with a cosine function feedback signal to produce an $\beta$-axis multiplier output signal;

a first summer for subtracting the $\alpha$-axis multiplier output signal from the $\beta$-axis multiplier output signal to produce a difference signal;

a proportional and integral regulator function for multiplying the difference signal by a function $$K_p + \frac{K_i}{s}$$

to produce a PI output signal, wherein $K_p$ is a constant value corresponding to a proportional gain of the proportional and integral regulator function, $K_i$ is a constant value corresponding to an integral gain of the proportional and integral regulator function, and s is a Laplace operator;

an integral function for multiplying the PI output signal by an integral function 1/s to produce an integration output signal;

a sine function for multiplying the integration output signal by a sine function to produce the sine feedback signal; and a cosine function for multiplying the integration output signal by a cosine function to produce the cosine feedback signal, wherein the estimated rotor angular position and the estimated rotor angular velocity for the dynamoelectric machine are derived from the proportional and integral regulator function output signal and the integration output signal.

14. The control of claim 13, further comprising:

a low pass filter for filtering the PI output signal by a low pass filter function $$\frac{\omega_c}{s + \omega_c}$$

to produce the estimated rotor angular velocity, where $\omega_c$ is a corner frequency of the low pass filter function;

a lookup table for generating a delay compensation based on a value of the estimated rotor angular velocity; and a second summer for subtracting the delay compensation from the integration output signal to produce the estimated rotor angular position.

* * * * *